(12) United States Patent
Smith et al.

(10) Patent No.: US 11,044,386 B1
(45) Date of Patent: Jun. 22, 2021

(54) METHOD AND SYSTEM FOR SYNCHRONIZING PLAYBACK OF INDEPENDENT AUDIO AND VIDEO STREAMS THROUGH A NETWORK

(71) Applicant: The DIRECTV Group, Inc., El Segundo, CA (US)

(72) Inventors: Alan Smith, Anaheim, CA (US); Dennis M. Hardwick, Huntington Beach, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 262 days.

(21) Appl. No.: 14/869,569

(22) Filed: Sep. 29, 2015

Related U.S. Application Data (60) Provisional application No. 62/093,679, filed on Dec. 18, 2014.

(51) Int. Cl.
*H04N 5/06* (2006.01)

(52) U.S. Cl.
CPC ...................... *H04N 5/06* (2013.01)

(58) Field of Classification Search
CPC ........................................................ H04N 5/06
See application file for complete search history.

(56) References Cited

U.S. PATENT DOCUMENTS

| | | | |
|---|---|---|---|
| 5,434,913 A * | 7/1995 | Tung ................... | H04L 12/1813 348/E7.083 |
| 5,844,600 A * | 12/1998 | Kerr ..................... | H04N 21/242 348/14.12 |
| 6,262,776 B1 * | 7/2001 | Griffits ................ | H04N 5/04 348/512 |
| 8,154,964 B2 * | 4/2012 | Fujinami .............. | H04N 5/85 369/47.2 |
| 8,505,054 B1 * | 8/2013 | Kirley ................. | H04N 21/4307 725/74 |
| 8,848,025 B2 * | 9/2014 | Talukder ............. | H04L 65/4076 348/14.08 |
| 9,088,406 B2 * | 7/2015 | Newham ............. | H04L 7/041 |
| 9,430,177 B2 * | 8/2016 | Thangadorai ....... | G06F 3/1423 |
| 9,877,130 B2 * | 1/2018 | Jia ........................ | H04S 1/007 |
| 10,191,715 B2 * | 1/2019 | Ando .................... | G06F 3/165 |
| 10,200,779 B2 * | 2/2019 | Lesaffre ............... | H04N 21/4126 |
| 2003/0231871 A1 * | 12/2003 | Ushimaru ........... | H04N 21/4394 386/207 |

(Continued)

*Primary Examiner* — John W Miller
*Assistant Examiner* — Humam M Satti
(74) *Attorney, Agent, or Firm* — Guntin & Gust, PLC; Andrew Gust (57) ABSTRACT

A method and system for synchronizing an audio signal and a video signal includes a source device receiving an audio-video signal comprising the audio signal and the video signal. The video signal has a video time stamp. The source device communicates the audio signal from the source device to a first sink device through a wireless network with a second time stamp and communicates the video signal to the second sink device with the video time stamp. The second sink device generates a synchronization (synch) signal and communicates the synch signal to the first sink device. The first sink device compares the synch signal to the second time stamp, adjusts a relative timing of the playback of the audio signal in response to comparing and generates an audible signal from the audio signal.

20 Claims, 9 Drawing Sheets

(56) References Cited

U.S. PATENT DOCUMENTS

| | | | | |
|---|---|---|---|---|
| 2004/0228367 A1* | 11/2004 | Mosig | H04L 65/608 | 370/503 |
| 2006/0136972 A1* | 6/2006 | Metzger | G08B 13/19689 | 725/105 |
| 2006/0140265 A1* | 6/2006 | Igler | H04N 21/42646 | 375/240.01 |
| 2007/0280361 A1* | 12/2007 | Kwon | H04W 76/10 | 375/259 |
| 2008/0040759 A1* | 2/2008 | She | H04L 29/06027 | 725/81 |
| 2008/0291863 A1* | 11/2008 | Agren | H04N 21/43637 | 370/315 |
| 2008/0291891 A1* | 11/2008 | Jerlhagen | H04L 43/0864 | 370/350 |
| 2009/0059962 A1* | 3/2009 | Schmidt | H04N 21/4307 | 370/503 |
| 2009/0073316 A1* | 3/2009 | Ejima | H04N 5/04 | 348/515 |
| 2009/0135856 A1* | 5/2009 | Gha | H04N 21/4392 | 370/503 |
| 2009/0141931 A1* | 6/2009 | Yadid-Pecht | G06T 1/0035 | 382/100 |
| 2010/0050222 A1* | 2/2010 | Legallais | H04N 7/16 | 725/112 |
| 2010/0128176 A1* | 5/2010 | Nakajima | G09G 5/006 | 348/512 |
| 2010/0194979 A1* | 8/2010 | Blumenschein | G06F 17/289 | 348/468 |
| 2011/0228888 A1* | 9/2011 | Gelter | H04L 49/90 | 375/371 |
| 2013/0188632 A1* | 7/2013 | Sheth | H04L 65/4015 | 370/350 |
| 2013/0223539 A1* | 8/2013 | Lee | H04N 21/4302 | 375/240.25 |
| 2014/0010515 A1* | 1/2014 | Lee | H04L 65/605 | 386/207 |
| 2014/0173136 A1* | 6/2014 | Hazelet | G06F 1/14 | 709/248 |
| 2014/0215535 A1* | 7/2014 | Elliott | H04N 21/2387 | 725/81 |
| 2015/0052571 A1* | 2/2015 | Stokking | H04N 21/242 | 725/116 |
| 2015/0095512 A1* | 4/2015 | Ali | H04N 21/4305 | 709/231 |
| 2015/0179227 A1* | 6/2015 | Russell | H04N 21/4122 | 386/201 |
| 2015/0181306 A1* | 6/2015 | Innes | H04N 21/4126 | 725/74 |
| 2015/0195428 A1* | 7/2015 | Lee | H04N 5/05 | 348/515 |
| 2015/0215496 A1* | 7/2015 | Matsuo | H04N 21/43637 | 348/515 |
| 2015/0215665 A1* | 7/2015 | Casagrande | H04N 21/4888 | 725/32 |
| 2015/0245306 A1* | 8/2015 | Boehlke | H04L 65/4084 | 370/350 |
| 2015/0296247 A1* | 10/2015 | Glasser | H04L 65/4084 | 725/74 |
| 2016/0034245 A1* | 2/2016 | Karunakaran | G06F 3/1454 | 345/2.2 |
| 2016/0182176 A1* | 6/2016 | Ramachandra | H04J 3/0661 | 370/429 |

* cited by examiner

METHOD AND SYSTEM FOR SYNCHRONIZING PLAYBACK OF INDEPENDENT AUDIO AND VIDEO STREAMS THROUGH A NETWORK

TECHNICAL FIELD

The present disclosure relates generally communicating audio and video though a network and, more specifically, to synchronizing an audio stream and a video stream when played back through separate devices.

BACKGROUND

The statements in this section merely provide background information related to the present disclosure and may not constitute prior art.

Providing a variety of content to users is important to content providers. Ease of use, variety and accessibility are all important aspects of a satisfactory user experience.

Home audio systems are increasingly being used to enhance the user's experience. For example, audio-video receivers or sound bars are used to provide an improved audio experience from that normally provided only by a television. Typically, an audio-video receiver is wired to a content source and a television by means of a wire. By using the wire, the audio signal stays synchronized with the video signal.

Wireless systems are increasing in popularity. This includes the use of wireless sound bars or other audio equipment. By communicating an audio signal wirelessly to a sound bar or other audio-video receiver, audio synchronization may be an issue. When the audio streams are communicated independently, no timing communication between the different devices is exchanged.

SUMMARY

The present disclosure provides a method for synchronizing video play back at a video sink device with an audio signal at the audio sink device so that the audio stream and the video stream remain synchronized during playback.

In one aspect of the disclosure, a method includes receiving an audio-video signal comprising an audio signal and a video signal at a source device. The video signal comprises a video time stamp. The method further includes communicating the audio signal from the source device to a first sink device through a wireless network with a second time stamp, communicating the video signal to a second sink device, generating a synchronization (synch) signal at the second sink device, communicating the synch signal from the second sink device to the first sink device, comparing the synch signal to the second time stamp at the first sink device, adjusting a relative playback timing of the audio signal in response to comparing and generating an audible signal from the audio signal at the sink device.

In a further aspect of the disclosure, a system includes a source device receiving an audio-video signal comprising an audio signal and a video signal. The video signal has a video time stamp. The source device communicates the audio signal from the source device to a first sink device through a wireless network with a second time stamp and communicates the video signal to the second sink device with the video time stamp. The second sink device generates a synchronization (synch) signal and communicates the synch signal to the first sink device. The first sink device compares the synch signal to the second time stamp, adjusts a relative timing of the playback of the audio signal in response to comparing and generates an audible signal from the audio signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Figure 1:
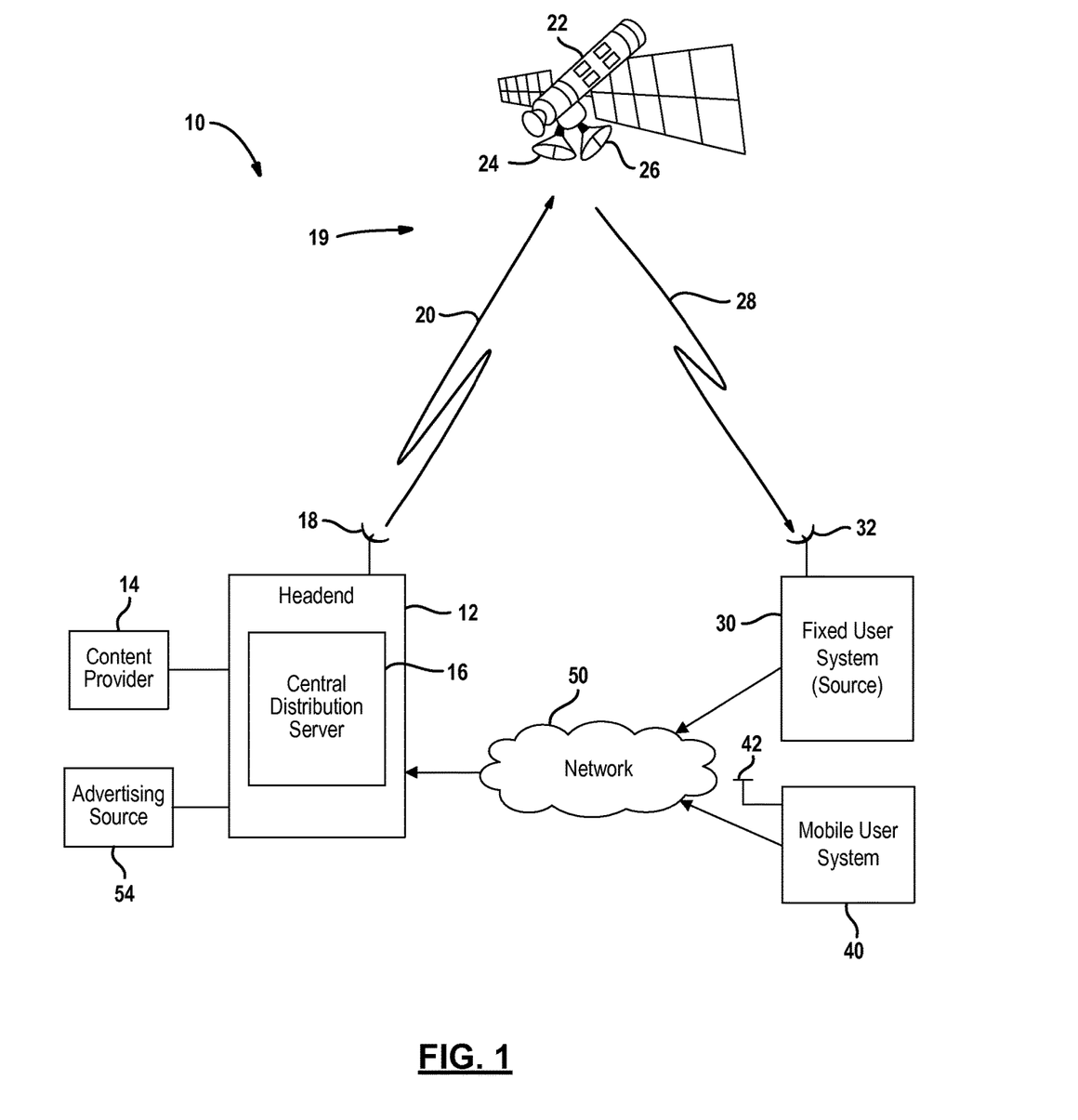
FIG. 1 is a high level block diagrammatic view of a satellite distribution system according to the present disclosure.

Referring now to FIG. 1, a communication system 10 is illustrated. Communication system 10 includes a head end 12 that is used as a processing and transmission source. The head end 12 may be referred to as a head end. A plurality of content providers 14, only one of which illustrated, may provide content to the head end 12. The head end 12 receives various types of content from a content provider 14 and communicates the content to system users. The head end 12 may also be associated with a central distribution server 16. The central distribution server 16 may be incorporated into the head end 12 or may be a separate item. The central distribution server 16 may be used for various types of distribution including resetting a user device, providing a software image, communicating advertisements, or providing an updated software image to a user device.

The head end 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the head end 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. The fixed user system may comprise a video sink device, an audio sink device that receive independent signals for playback. Further details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network or a combination thereof. The network 50 may be a one-way network so that data or content may be communicated from the fixed user system 30 or the mobile user system 40 through the network 50 to the head end 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the head end 12, which includes the distribution server 16, and the fixed user system 30 and the mobile user system 40.

The head end 12 may also be in communication with an advertising source 54. The advertising source 54 may provide advertising content to be used as insert content to the head end 12. The head end 12 communicates the advertisement insert content to the user systems through the satellite 22 or the network 50. Advertising source 54 may provide the advertisement with various types of metadata that are used in the content broadcasting.

The content provided by the head end 12 and the advertising source 54 may be provided in transport stream comprising a plurality of packets. Along with the audio and video streams, metadata may also be included with the packets forming the advertising insert content and the content processing system content. The transport stream may be modulated, encoded and multiplexed for communication to the user systems.

Figure 2:
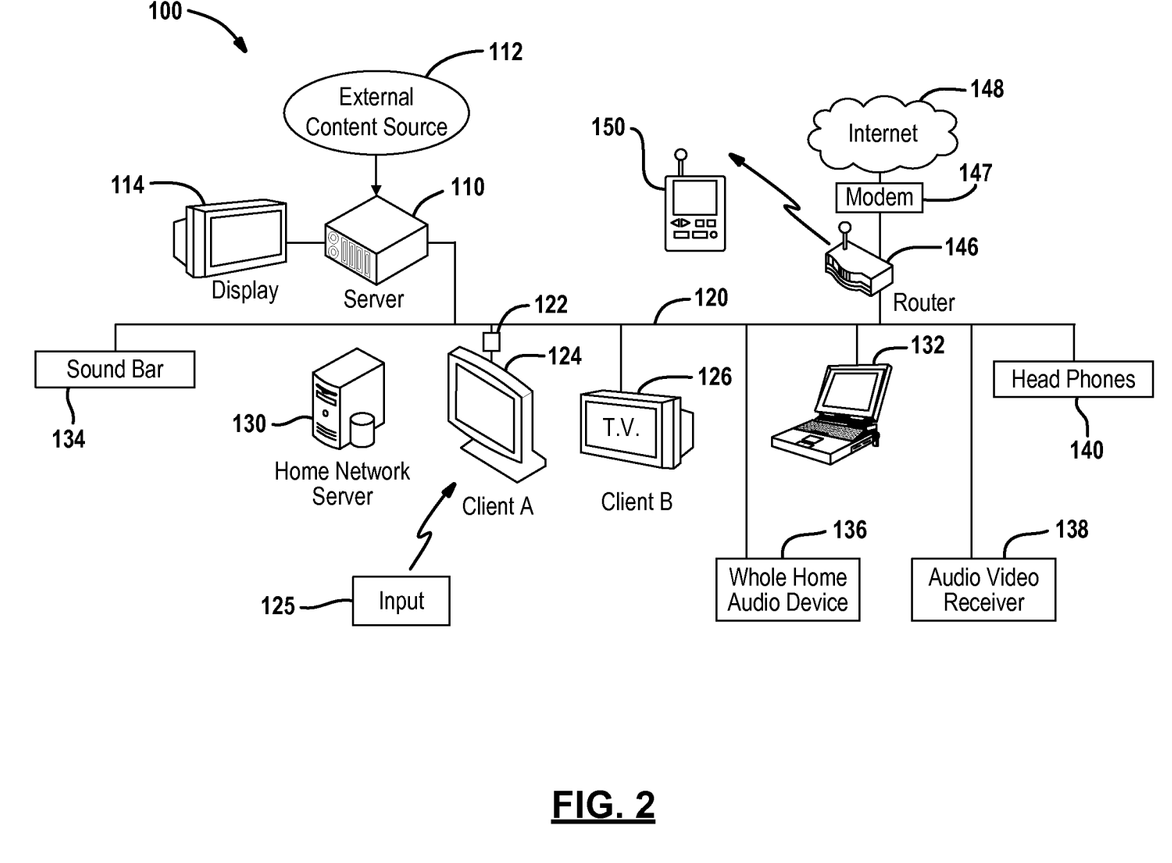
FIG. 2 is a block diagrammatic view of a first network topology.

Referring now to FIG. 2, one example of a user system 100 is illustrated in further detail. The user system 100 may be mobile or fixed. The components of the system 100 illustrated are provided by way of example and are not meant to be limiting. A greater or lesser number of components may be provided.

The user system 100 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, advertisements and combinations thereof may be part of the external source.

The server device 110 may act as a set top box for directly communicating content directly to a display 114. The server 110 may also be considered a video sink device. The content in a direct connect may not be renderable content but rather directly displayable signals within a frequency band. The signals to display 114 may also be renderable. The display 114 may be a television or monitor.

The server 110 may also be in communication with a local area network 120. Although a physical line is illustrated, wired, wireless, optical signals or combinations thereof may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both client A and client B as well as acts as an intermediary if client A communicates with Client B, or vice versa.

The server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

The client device 122 may receive signals from an input 125. The input 125 may be various types of devices such as a tablet computer, a cellular phone or the like. The input provides an input command indicative of the user wanting to control a function of the client device or server device. The input may also be a person generating an audio signal comprising a voice signal with spoken words. The input signals from the input 125 may be in a variety of forms including RF, optical signals, a voice signal or the like. Examples of an input type include an audio input signals, a graphical input signal, a gesture signal such as a performing a swipe command on a touch screen of an input device used for the input 125, a pointing device signal such as a mouse or stylus or another type of graphical input. The input 125 may have an application therein for generating screen displays and generating control signals.

Ultimately, the input 125 provides a signal to the client device 122. The client device 122 converts the input 125 to data which is communicated to the server device 110. The server device 110 generates a response to the client. The response may be a changed video input or a changed remote user interface.

A second client 126, Client B, may also be in communication with the server device 110 through the local area network 120. Client B may contain an internal client device, not shown, for displaying rendered signals on the display. Client B may be referred to as a video sink device as well. The internal client device may be functionally equivalent to the standalone client device 122. Because both the first client, Client A, and the second client, Client B, are in communication directly with the server device 110, the network may be referred to as a closed network. Various numbers of clients may be connected to the local area network 120. The input 125 may also be in direct communication with the Client B 126. That is, the input 125 may be directly input to a display or television. The display or television of Client B 126 may process the signals like the client device 122 or could also have video decoders therein.

The local area network 120 may include a number of home network elements. One home network element may be a home network server device 130 or other computing device. Another home network element may include a laptop computer 132 that is in communication with the local area network 120.

A router 146 may communicate with other devices through an external network such as the Internet 148 through a modem 147. The local area network 120 may be defined by the signals that are communicated through the router rather than externally to the Internet 148.

The user system 100 may also have wireless elements associated therewith. The router 146 or another network device may generate wireless signals that allow a wireless device 150 to communicate with at least one server device 110 or 130. The wireless device 150 may, for example, be a personal digital assistant, a cellular phone, a personal media device or a Blu-Ray or DVD player. Of course, other wireless devices may be part of the network.

Audio sink devices may also be included within the network. One example of an audio sink device is a sound bar 134. The sound bar 134 may be wirelessly connected to a whole home audio device 136 or an audio-video receiver 138. Headphones 140 are another example of a wireless audio sink device that may be communicated to the local area network 120. The headphones 140 may also be in communication with the whole home audio device 136 or the audio-video receiver 138. The whole home audio device 136 and the audio-video receiver 138 have similar functions. The whole home audio device 136 is more extensive in function and can facilitate communications throughout a whole home. The audio-video receiver 138 may be used for a small number of rooms or only in one room. Both the whole home audio device 136 and the audio-video receiver 138 may have several inputs such as from a source or server 110. The operation of the intercommunication of video sinks devices and audio sink devices, such as a sound bar 134 or headphones 140, will be described below. Audio signals may be communicated to the sound bar 134 and the headphones 140 through the wireless local area network. Video signals may be communicated to the video sink devices through the wireless network separately. The synchronization of the audio signal and video signal will also be described below.

Figure 3:
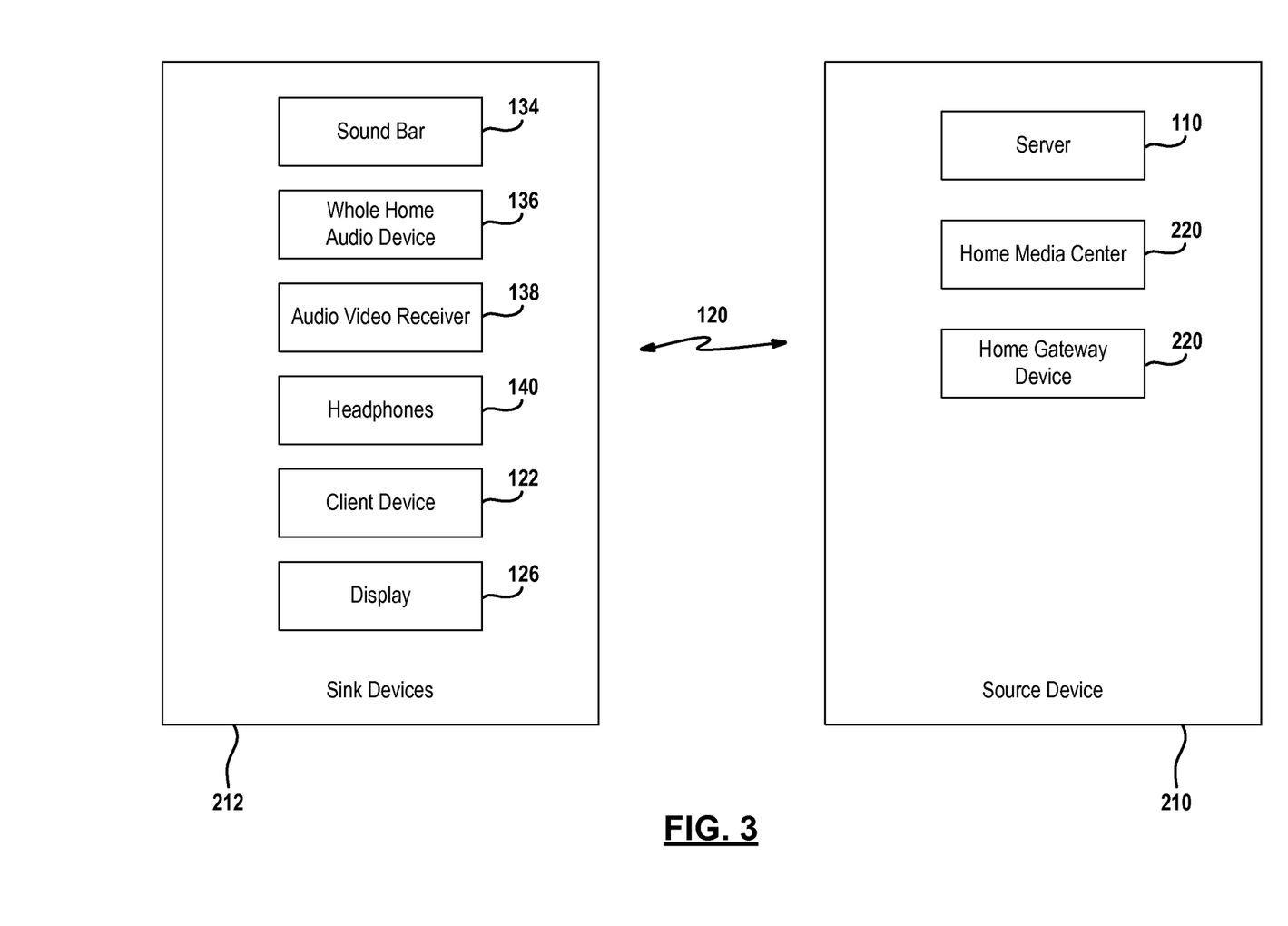
FIG. 3 is a simplified block diagrammatic view of synch devices in communication with a source device.

Referring now to FIG. 3, source devices 210 may be in communication with audio and video sink devices 212 through the local area network 120. One or more source devices 210 may be included within the local area network 120. For example, the server 110 may be one example of a source device. A home media center 220 may also be included as a source device since it receives content. As mentioned above, the server may be a video sink device as well. The home media center 220 may provide other functions but may also include the functions of the server 110. The home media center 220 may provide audio and video signals to various devices in a wired and/or wireless manner.

One example of a home media center is the Genie® device available through DIRECTV®. The home media center 320 may include a plurality of tuners and a plurality of outputs that may be in different rooms of the home.

The home gateway device 222 may also be included as a source device 210. The home gateway device 222 may also include the functions of the home media center 220 and server 110 as described above. In addition, the home gateway device 222 may also include the router 146 and the modem 147. Thus, the home gateway device 222 forms the connection to the external source 112, as well as the internet 148, as well as forming the local area network 120. The home media center 220 and home gateway device 222 may also be a video sink device for the same reasons as the server device 110.

The sink devices 212 may include the display 126, sound bar 134, the whole home audio device 136, the audio receiver 138 and the headphones 140. As mentioned above, one or more of the devices may be included within the local area network. Ultimately, the source devices 210 receive signals from the external source 112 or the internet 148 and communicate video and audio signals to the sink devices 212. This may be done separately, hence the need for synchronization. This may include the audio signal from the received signals, the video signals or both. In one example, the sink devices 212 receive the audio signals while another sink device, such as a display device, receives the video signals. Synchronizing the audio and video signals is described below.

A client device 122 or a source device directly connected to a display may also act as the sink device 212 as mentioned above relative to the server 110, home media center 220 and home gateway device 222. The client device 122 may be wirelessly connected to the display associated therewith.

Figure 4:
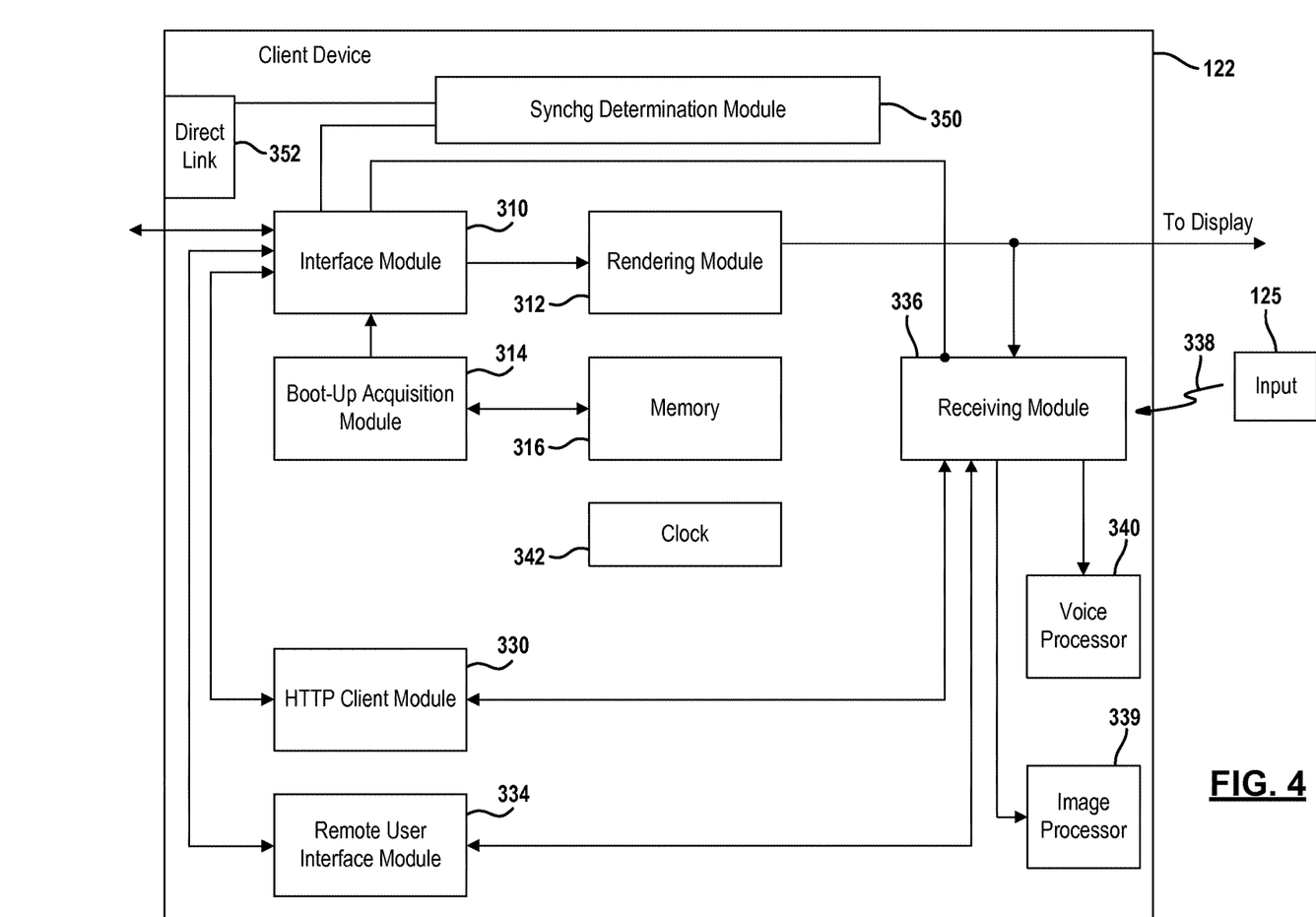
FIG. 4 is a simplified block diagrammatic view of a client device.

Referring now to FIG. 4, a client device 122 is illustrated in further detail. The client device 122 may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate through a local area network to the server device 110. The client device 122 may also be incorporated into various types of devices such as a television, audio devices, video gaming system, a hand-held device such as a phone or personal media player, a computer, or any other type of device capable of being networked. When connected to a television or other display devices, the time lag for the signals from the client to the display may be negligible or easily accounted for during calibration.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 communicates with a rendering module 312. The rendering module 312 receives formatted signals through the local area network that are to be displayed on the display. The rendering module 312 places pixels in locations as instructed by the formatted signals. Rendering may also take place using vector graphics commands that instruct a group of pixels to be formed by the client based on simple instructions. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location for the server device to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

Communications may take place using HTTP client module 330. The HTTP client module 330 may provide formatted HTTP signals to and from the interface module 310.

A remote user interface module 334 allows clients associated with the media server device to communicate remote control commands and status to the server device. The remote user interface module 334 may be in communication with the receiving module 336. The receiving module 336 may receive the signals from a remote control or input 125 (FIGS. 2-6) through input 338 associated with the display and convert them to a form usable by the remote user interface module 334. The remote user interface module 334 allows the server device to send graphics and audio and video to provide a full featured user interface within the client. Screen displays may be generated based on the signals from the server device. Thus, the remote user interface module 334 may also receive data through the interface module 310. It should be noted that modules such as the rendering module 312 and the remote user interface module 334 may communicate and render both audio and visual signals.

The receiving module 336 may receive input signals from the input 125 illustrated in FIGS. 2-5. The input 125 may be a visual input signal that may include, but is not limited to, a graphical input signal such as a stylus signal or a gesture signal, a mouse signal, or a pointer signal. Each visual input signal may include a relatively large amount of data compared to a standard button signal from a remote control. The gesture signal may be on a screen or in front of a camera associated with the client device. Each signal may consist of a sequence of numerous sub-signals such as a sequence of multiple point and time positions representing the motion a user makes as an input signal. A graphical input signal might also consist of an image of sequence of images taken from a cell phone camera. An image processor 339 may be coupled to the receiving module 336. The image processor 339 processes the visual input signal to determine a desired control signal to be sent to the server device as a data signal. For example, an image of a face may unlock or reconfigure a client device. A face image may be used to configure setting of a set top box or server device associated with a user.

A voice signal may also be received through the input 338 to the receiving module 336. A voice processor 340 in communication with the receiving module 336 may process or recognize the audio signal and convert the audio voice signal into a text file. Ultimately, the inputs to the receiving module 336 may be communicated through the interface module 310 to the server device.

The data received through the receiving module 336 may be communicated directly to the interface module 310 and ultimately the server device with very little processing because very little processing power may be included within a client device 122. The receiving module 336 may convert the signals input into electrical signals for transmission or communication to the server device. For example, the raw voice signals may be communicated to the server device through the interface module 310. The raw voice signal may be essentially be recorded voice signals with no voice recognition applied thereto.

A clock 342 may communicate with various devices within the system so that the signals and the communications between the server device and client are synchronized and controlled.

A synch determination module 350 may generate a synch signal based on a received video signal. The synch signal may be generated to include a relative time on a received video signal such as a presentation time stamp (PTS). The synch signal may be generated to include a time stamp. The time stamp may be received in a video signal from a server. The synch signal may be communicated to an audio sink device through a direct link 352 or a local area network through the interface module 310 to allow the audio signal to be synched with the video for playback purposes. This is described in detail below. The direct link 352 may be an optical, RF link or Bluetooth® link.

Figure 5:
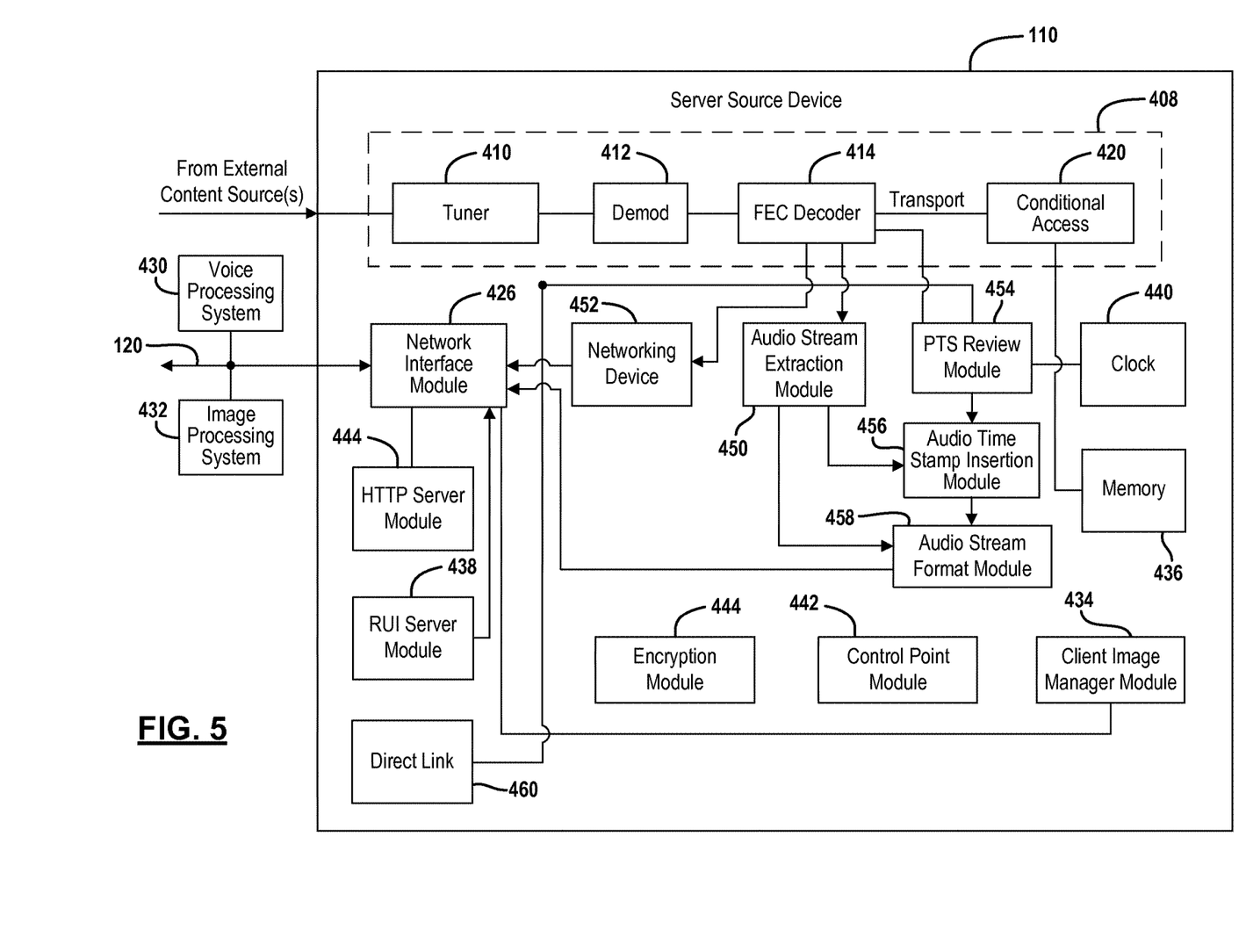
FIG. 5 is a block diagrammatic view of a server.

Referring now to FIG. 5, a server device 110 is illustrated in further detail. The server device 110 is used for communicating with various client devices 122. The server device 110, as mentioned above, may also be used for communicating directly with a display. The server device 110 may be a standalone device or may be provided within another device. For example, the server device 110 may be provided within or incorporated with a standard set top box. The server device 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system, a home media center, or a home gateway system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a tuner 410, a demodulator 412, a forward error correction decoder 414 and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

An interface module 426 may be used for communicating with the local area network 120. The network interface module 426 may be used to receive and transmit various signals. For example, the network interface module 426 may be used to communicate audio signals separately from video signals to the various devices in the local area network 120. The interface module 426 may also be used for receiving input from the client device. For example, the network interface module 426 may receive various types of input data signals communicated from various input devices to the client devices. The data received through the network interface module may include data from a mouse, from a stylus or pointer device, a voice command, or other type of graphical or gesture command.

The network interface module 426 may also communicate with the internet. In the present example, when a voice signal or visual signal is provided the voice signal or visual input signal may be communicated to an external device such as a voice processing system 430 or image processing system 432 to perform voice recognition and return a text signal or command signal to the network interface module 426. The voice processing system 430 and the image processing system 432 may also be included within the server device as well.

The server device 110 may also be used for other functions including managing the software images for the client. A client image manager module 434 may be used to keep track of the various devices that are attached to the local area network or attached directly to the server device. The client image manager module 434 may keep track of the software major and minor revisions. The client image manager module 434 may be a database of the software images and their status of update.

A memory 436 may also be incorporated into the server device 110. The memory 436 may be various types of memory or a combination of different types of memory. These may include, but are not limited to, a hard drive, flash memory, ROM, RAM, keep-alive memory, and the like.

The memory 436 may contain various data such as the client image manager database described above with respect to the client image manager module 434. The memory 436 may also contain other data such as a database of connected clients. The database of connected clients may also include the client image manager module data. The database of connected clients may identify the type of device so proper formatting of signals such as audio or video signal may be performed properly at the server.

A remote user interface (RUI) server module 438 may control the remote user interfaces that are provided from the server device 110 to the client device 122 or sink devices.

A clock 440 may also be incorporated within the server device 110. The clock 440 may be used to time and control the various communications with the various client devices 122. The clock may be used in the method of synchronizing the audio and video signals that are independently communicated through the network.

A control point module 442 may be used as a controller to control and supervise the various functions provided above within the server device. The functions may ultimately include, but are not limited to, storing the command data, processing the data to determine what response is desired for the data and generating a response signal to the client and determining relative timing and adjustments for the audio and video signals.

It should be noted that multiple tuners and associated circuitry may be provided. The server device 110 may support multiple client devices 122 and sink devices 212 within the local area network. Each device is capable of receiving a different channel or data stream. Each client device may be controlled by the server device to receive a different renderable content signal.

An encryption module 444 may also be incorporated into the server device 110 for encrypting the output of the server 110. The encryption module 444 may also provide digital transmission content protection (DTCP) to copy protected content.

The decoder 414 may be in communication with an audio stream extraction module 450. The audio stream extraction module 450 extracts the audio stream from the audio-video signal received through the tuner 410, the modulator 412 and the decoder 414. As mentioned above, a separate audio stream may ultimately be communicated to a sink device 212 of FIG. 3.

The decoder 414 may also be in communication with the networking device 452. The networking device 452 may be in communication with the network interface module 426 for communicating wireless video signals through the local area network 120. As mentioned above, the networking device may communicate only video signals through the local area network while the audio stream extraction module 450 extracts the audio stream for separate communication ultimately through the network interface module 426. The networking device 452 may send the audio and video streams separately through the network.

The decoder 414 may be in communication with a presentation time stamp (PTS) review module 454. The presentation time stamp review module 454 may obtain the time stamp associated with the video signal. The time stamp may be a presentation time stamp that provides an indication relative to the beginning of content of a various position. The presentation time stamp review module 454 and the audio stream extraction module 450 may be in communication with an audio time stamp insertion module 456. The audio time stamp insertion module 456 receives the audio stream from the audio stream extraction module which does not have a time stamp. The audio time stamp insertion module 456 inserts the time stamp into the audio stream. The audio stream with the time stamp may also need to format in an audio stream format module 458. In either case, the audio stream from the audio time stamp insertion module 456 or the audio stream format module 458 are communicated to the network interface module 426 and ultimately through the local area network 120 through the networking device 452.

In another example, both the audio stream and video stream may be communicated to both an audio sink device, such as a sound bar, and a video sink device, such as a television. The audio sink device may ultimately not use the video device for displaying, but rather just for the presentation time stamp associated therewith.

Figure 6:
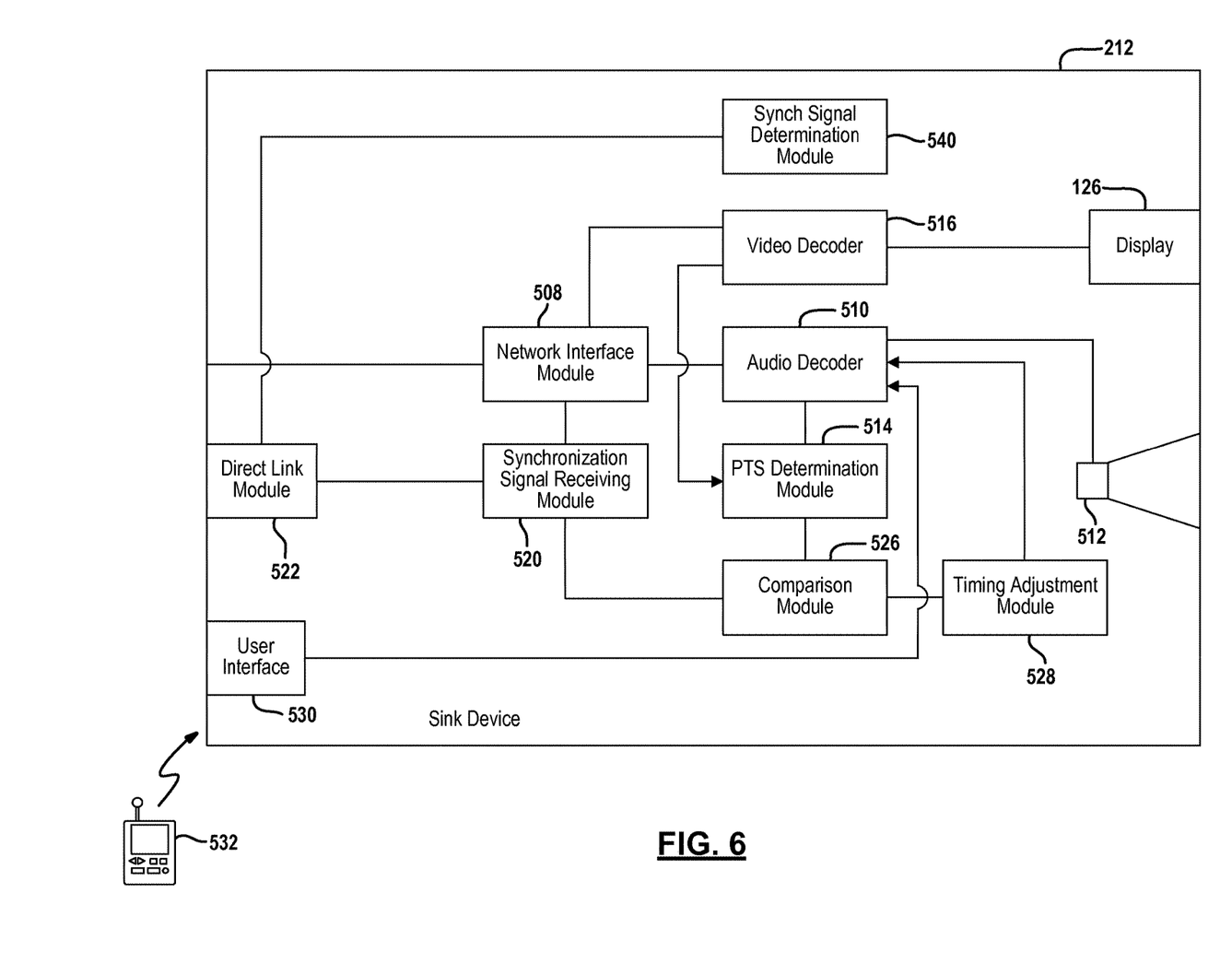
FIG. 6 is a block diagrammatic view of a synch device.

Referring now to FIG. 6, the synch device 212 is illustrated in further detail. A video and audio sink device may be configured differently as described below. Thus not all the components of FIG. 6 are necessarily included for all sink devices.

The sink device 212 may include a network interface module 508, such as that described above, relative to the network interface module 426 in FIGS. 5 and 310 of FIG. 4. The network interface module 508 may be in communication with an audio decoder 510. The audio decoder 510 ultimately decodes the audio signal and communicates the audio signal to a speaker 512. The audio decoder 510 may be in communication with a presentation time stamp determination module 514. The presentation time stamp determination module 514 receives the time stamp from the audio decoder 510 (insertion signal or video decoder (part of originally received A-V signal) as was described above. As previously mentioned, a time stamp may be inserted within the audio signal at the server or source device. The inserted time stamp may correspond to the time stamp of the video signal.

In another example, a video decoder 516 is in communication with a network interface module 508. The network interface module 508 receives both a video signal and an audio signal as an AV signal is communicated from the source or server device. Although the sink device 212 may not have a screen display for displaying a video, the video decoder 516 is used by the PTS determination module 514 to determine the time stamp associated with the audio-video signal.

The network interface module 508 may also be in communication with a synchronization signal receiving module 520. When the sink device is an audio sink device, the synchronization signal receiving module 520 may receive a synchronization (synch) signal from a video sink device. The synch signal which is communicated through the network interface module 426 or through the direct link 460 to the sink device.

A direct link module 522 may also be incorporated into the sink device. The sink device may receive a direct link signal 522 from the direct link 460 of a video sink or server device 110. The direct link module 522 may be an optical, RF, Ethernet, or other type of direct link (or combinations thereof) that is in communication with the source device 110. The synch signal received at the synchronization signal receiving module 520 may include a copy of the video time stamp itself or may include a time indicator correspond to the time stamp. An address of the sink device on the network may also be provided. In response to receiving a synch signal at the sink device, the synchronization signal receiving module 520 communicates the synch signal to a comparison module 526. The comparison module compares the time stamp or time indicator received in the synchronization signal receiving module 520 with the time stamp from the time stamp determination module 514 received from either the audio or video decoder. The comparison module 526 compares the two time stamps. When a difference in time stamps is determined, the timing adjustment module 528 may adjust the timing of the audio playback to align with the video playback. The timing adjustment module 528 may be made in steps or incrementally that require more than one adjustment. Further, the timing adjustment module 528 may require continually determination and adjustment during the playback process to prevent any drift in the system.

When the sink device is a video sink device, the time stamp read is used to generate a synch signal at the synch signal determination module 538. A synch signal may be communicated through the direct link module 522 to an audio sink device. The local network may also communicate the synch.

The sink device 212 may also include a user interface 530 that is in communication with a remote control device 532. Signals from the remote control device 532 may be used to control the playback of the audio signal. The remote control device 532 may provide command signals for raising and lowering the volume of the audio output, stopping the playback of the audio output, forwarding or rewinding the playback of the audio output or various other controls.

Figure 7A:
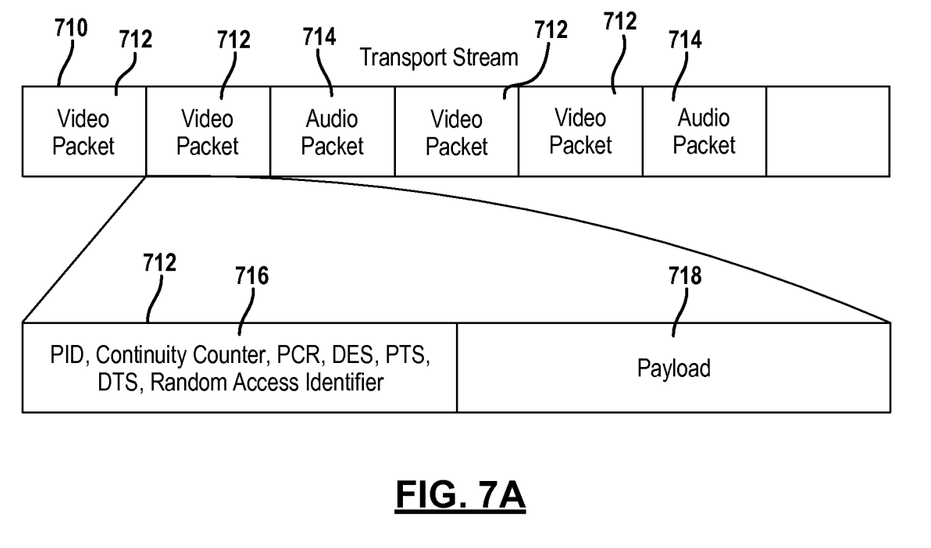
FIG. 7A is a diagrammatic representation of a transport stream and packet having data according to the present disclosure.

Referring now to FIG. 7A, a transport stream packet 710 is illustrated having a plurality of video packets 712 and a plurality of audio packets 714. Typically, a transport stream and a video associated therewith have a high amount of data relative to an audio stream and therefore more video packets 712 are shown relative to the audio packets. The details of one of the video packets 712 are illustrated. In this example, a header 716 includes a plurality of data. The head 716 may include various types of metadata. The packets 712 may also include a payload portion 718.

The header 716 may include various types of data, such as a continuity counter, a packet identifier (PID) that is helped to detect and decode the packets, a packetized elementary stream (PES) header. The PES header may include a presentation time stamp (PTS) that is relative to a program clock reference. The PES data may be broken up into multiple transport stream packets. The PTS may be relative to the program clock reference so that its 33 byte value is based on a 90 kHz.

Figure 7B:
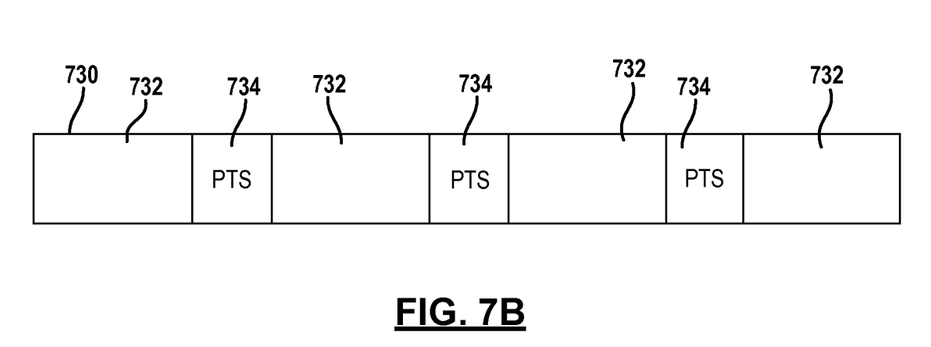
FIG. 7B is a diagrammatic representation of an audio stream with inserted timestamps therein.

Referring now to FIG. 7B, an audio signal 730 having audio data and an inserted time stamp 734 is set forth. A plurality of time stamps or other time indicators may be inserted into the audio signal 730. By way of example, the time stamps 734 may be presentation time stamps. The time stamps may be inserted to correspond to the video time stamps. The clock 440 in FIG. 6 may facilitate the relative timing.

Figure 8:
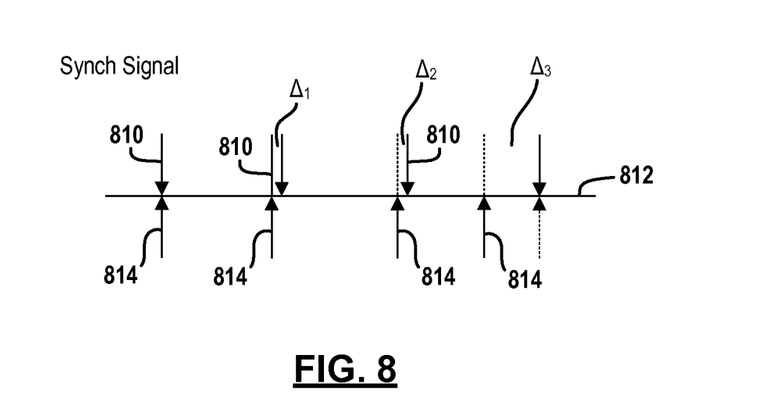
FIG. 8 is a timing diagram of a synch signal and a time stamp according to the present disclosure.

Referring now to FIG. 8, a plurality of synch signals 810 are illustrated relative to a time line 812. Each synch signal corresponds to a synch signal time. Time stamps of the audio signal 814 are shown with delta times (change in the differences of the synch signal and the actual timing of the audio signal before adjustment). The second illustrated synch signal 810 has a delta time ($\Delta_1$) compared to the actual synchronized time. The $\Delta_1$ is compensated in the sink device by the timing adjustment module 528 illustrated in FIG. 6. However, if the delta time is lower than a predetermined threshold, a correction may not be made. The timing $\Delta_2$, also illustrated in FIG. 8, is greater than $\Delta_1$, but less than $\Delta_3$. The relative timing of the playback of the audio signal may be reduced when the $\Delta_3$ signal is greater than a predetermined time threshold.

Figure 9:
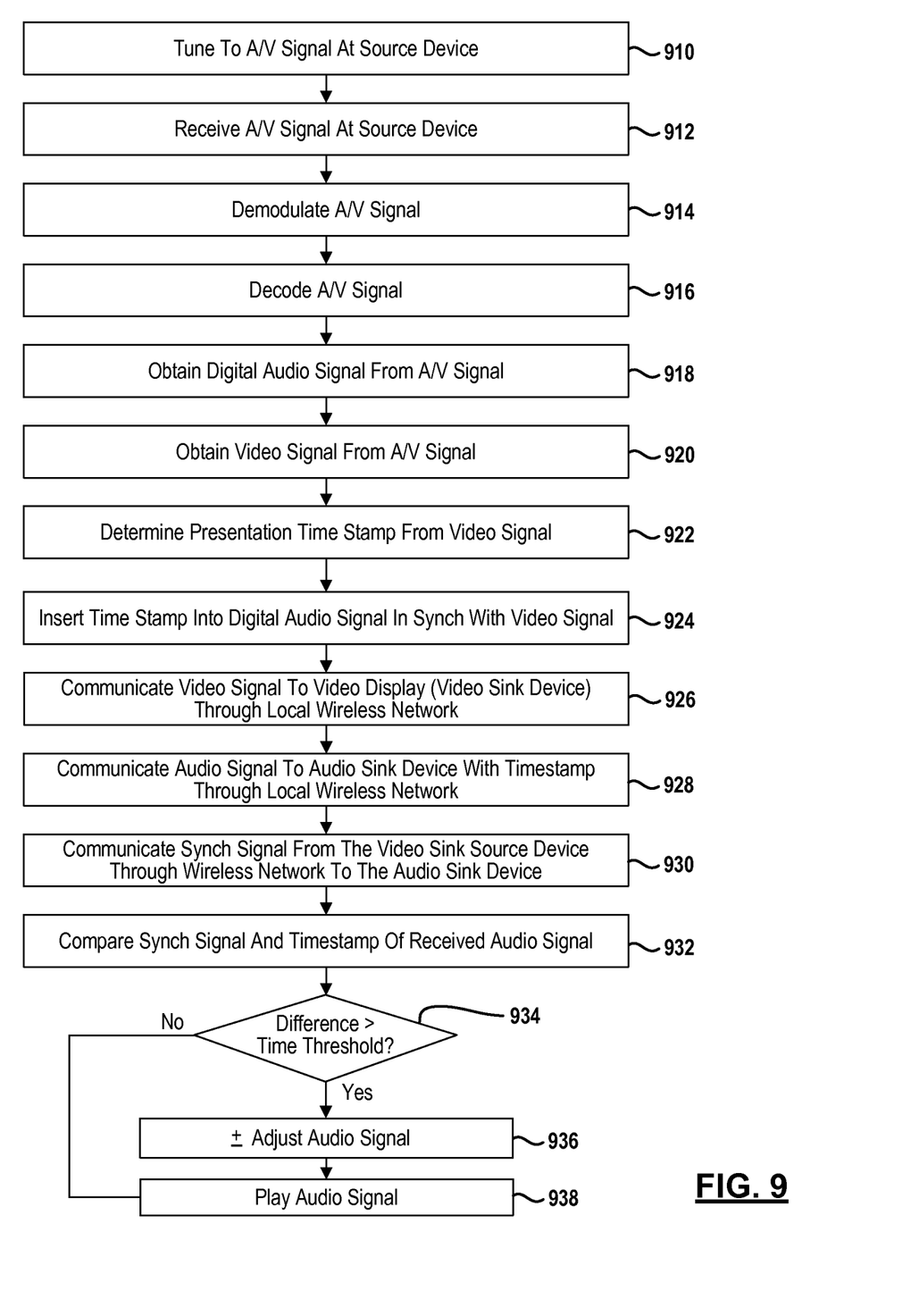
FIG. 9 is a flowchart of a method for synching an audio signal with a video signal.

Referring now to FIG. 9, a method for synchronizing an audio signal with a video signal is set forth. The steps set forth in FIG. 9 illustrate the steps of the server or source device and sink devices. In step 910, an audio-video signal is tuned to by the source device 210. In step 912, the audio-video signal is received at the source device 210. In step 914, the audio-video signal is demodulated. In step 916, the audio-video signal is decoded. In step 918, a digital audio signal may be obtained from the audio-video signal. The digital audio signal may be an audio bit stream. The audio bit stream does not include a time stamp at this time. In step 920, the video signal is obtained from the audio-video signal. In step 922, the video time stamp, which in this example is the presentation time stamp typically included in an MPEG signal, is determined from the video signal. As mentioned above, the presentation time stamp may be included within the header of the packet.

In step 924, the time stamp or other time data is inserted into the digital audio signal in synch with the video signal. That is, the same time stamp data from the video time stamp may be included within or inserted into the digital audio signal. The time stamp data allows the audio signal to be synched with the video signal after communication to the audio sink device. In step 926, the video signal is communicated to a video display or video sink device, such as television or monitor, through the local wireless network. Both the video and audio signal may be communicated to the video sink device. In step 928, the audio signal is communicated to an audio sink device with the time stamp data through the wireless network. As mentioned above, the audio signal and video signal may drift out of synchronization due to changes in the network, electronic processing or other inherent delays in the system.

In step 930 the synch signal is communicated from the video sink device to the audio sink device. The synch signal may be communicated directly from the video sink device to the audio sink device through a direct connection that may be wired or wireless. A time stamp or time indicator data may be included with the synch signal. The time stamp or the synch signal is derived from the video signal. Alternatively, the synch signal may be communicated through the wireless network.

In step 932, the time stamp of synch signal and the time stamp of the received audio signal are compared in the audio sink device. In step 934, if the difference is greater than a predetermined threshold, step 936 adjusts the audio signal. The comparison to a threshold is optional. Any different could be adjusted. The audio signal timing may be adjusted in a forward or reverse direction in an increment to allow the signal to become closer to a timing of the synch signal. In step 938, the audio signal is played by the audio synch device. By playing out the audio signal, an audible signal is generated. The audible signal is also generated in step 938 after step 934 when the difference is not greater than a time threshold. In step 934, when the difference is not greater than a time threshold, the signal is relatively closely in synchronization.

Calibration may be performed to ensure the delays of the network are compensated properly. Some delay may be determined between through the direct connection during communication of the synch signal. This may be done when a technician installs the system at the home. The calibration may also be performed using a test routine provided to the customer.

Figure 10:
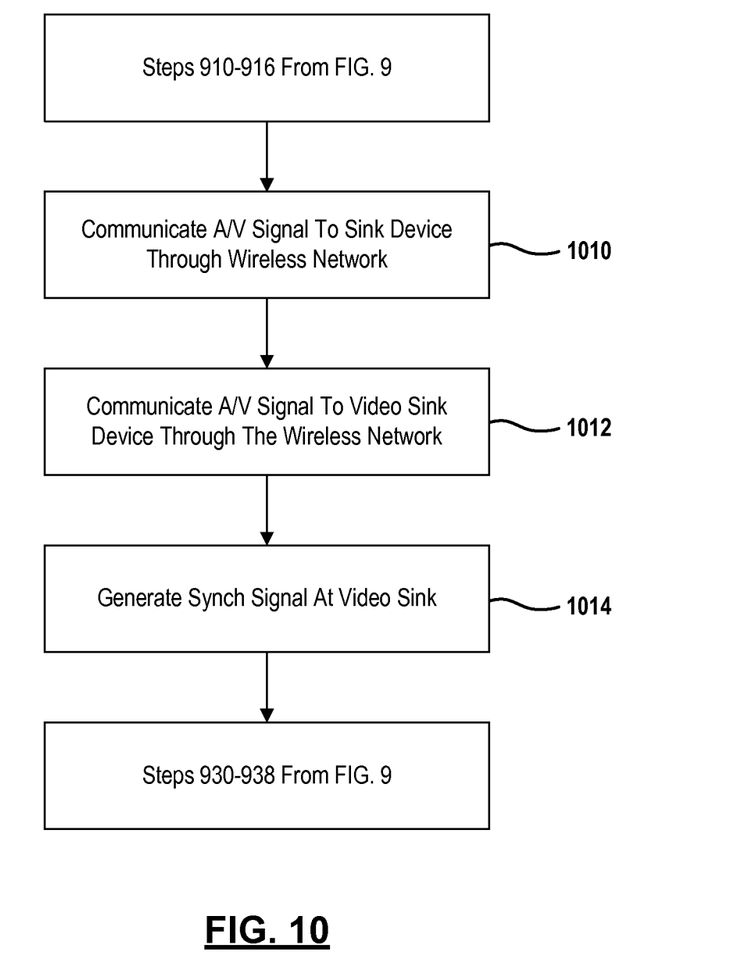
FIG. 10 is an alternative method for synching an audio signal and a video signal.

Referring now to FIG. 10, a method similar to that set forth above with respect to FIG. 9 is set forth. However, a separate time stamp signal is not provided in the audio signal. Steps 910-916, from FIG. 9, are performed. Thereafter, the audio-video signal is communicated to the audio synch device through the wireless network from the source device. This is performed even though the audio synch device may be merely used for the audio display and may be otherwise disregard the video signal except for the time stamp therein. The synch device may include a video decoder as described above to obtain the time stamp. In step 1012, the audio-video signal is communicated to the video sink device through the wireless network.

In step 1014, a synch signal is generated at the video sink device. The synch signal is communicated in steps 930-938 of FIG. 10. The synch signal is compared to the synch signal obtained from the video signal in the audio-video signal communicated to the synch device in step 1010. By performing this method, the video decoder of the audio sink device is used to obtain a time stamp that is compared with the time stamp in the synch signal as was described in FIG. 10.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   receiving, at a source device, an audio-video signal comprising an audio signal and a video signal, the video signal comprising a first time stamp;
   separating the audio signal from the video signal;
   inserting the first time stamp from the video signal as a second time stamp into the audio signal;
   communicating the audio signal with the second time stamp from the source device to an audio sink device through a network;
   communicating the video signal with the first time stamp from the source device to a video sink device through the network;
   generating a synchronization (synch) signal at the video sink device, the synch signal comprising a synch time stamp derived from the first time stamp based on a relative time;
   communicating the synch signal with the synch time stamp from the video sink device to the audio sink device;
   determining a difference between the synch time stamp and the second time stamp at the audio sink device;
   when the difference is greater than a threshold, adjusting a relative playback timing of the audio signal in response to comparing the synch time stamp to the second time stamp at the audio sink device; and
   generating an audible signal using the relative playback timing from the audio signal at the audio sink device.

2. The method as recited in claim 1 wherein receiving the audio-video signal comprises receiving a satellite signal at the source device.

3. The method as recited in claim 1 wherein receiving the audio-video signal comprises receiving a received signal at the source device from a head end.

4. The method as recited in claim 3 wherein receiving the audio-video signal comprises demodulating and decoding the received signal, forming a transport stream and determining the audio signal and the video signal from the transport stream.

5. The method as recited in claim 4 wherein determining the audio signal comprises determining a digital bit stream.

6. The method as recited in claim 1 wherein communicating the synch signal comprises communicating the synch signal to the audio sink device through the network.

7. The method as recited in claim 1 wherein communicating the synch signal from the video sink device to the audio sink device comprises communicating the synch signal through a direct connection.

8. The method as recited in claim 1 wherein adjusting the relative playback timing comprises adjusting an audio signal playback time by an increment toward a synch signal time.

9. A system comprising:
   a source device receiving an audio-video signal comprising an audio signal and a video signal, the video signal comprising a first time stamp;
   the source device separating the audio signal from the video signal;
   the source device inserting the first time stamp from the video signal as a second time stamp into the audio signal;
   the source device communicating the audio signal with the second time stamp to an audio sink device through a network and communicating the video signal with the first time stamp to a video sink device;
   the video sink device generating a synchronization (synch) signal comprising a synch time stamp derived from the first time stamp and communicating the synch signal to the audio sink device;
   the audio sink device determining a difference between the synch time stamp and the second time stamp, when the difference is greater than a threshold, adjusting a relative playback timing of the audio signal in response to comparing the synch time stamp to the second time stamp and generating an audible signal using the relative playback timing from the audio signal.

10. The system as recited in claim 9 wherein the audio-video signal comprises a satellite signal.

11. The system as recited in claim 9 wherein the audio-video signal comprises a received signal from a head end.

12. The system as recited in claim 11 wherein the source device demodulates, decodes the received signal, forms a transport stream and determines the audio signal and the video signal from the transport stream.

13. The system as recited in claim 12 wherein the audio signal comprises a digital bit stream.

14. The system as recited in claim 9 wherein the video sink device communicates the synch signal to the audio sink device through the network.

15. The system as recited in claim 9 wherein the video sink device communicates the synch signal to the audio sink device through a direct connection.

16. The system as recited in claim 9 wherein the relative timing comprises an increment toward a synch signal time.

17. A non-transitory machine-readable medium, comprising executable instructions that, when executed by a processing system including a processor, facilitate performance of operations, the operations comprising:
   receiving from a source device, at an audio sink device, an audio stream having an audio stream timestamp, the audio stream timestamp having been copied, by the source device, from a video stream timestamp in a video stream;
   receiving, from a video sink device that received the video stream with the video stream timestamp from the source device, a sync signal that includes a sync timestamp based on the video stream timestamp and a relative time at the video sink device; and
   modifying, at the audio sink device, an audio playback time, wherein the modifying the audio playback time is in response to a comparison between the audio stream timestamp and the sync timestamp.

18. The non-transitory machine-readable medium of claim 17 wherein the receiving the audio stream comprises receiving the audio stream over a local area network.

19. The non-transitory machine-readable medium of claim 17 wherein the receiving the audio stream comprises receiving the audio stream over a wireless network.

20. The non-transitory machine-readable medium of claim 17, the operations further comprising receiving from the source device, at the audio sink device, the video stream.

* * * * *